United States Patent
Agmon et al.

(10) Patent No.: US 7,626,930 B2
(45) Date of Patent: Dec. 1, 2009

(54) HASH-BASED MULTI-HOMING

(75) Inventors: Gideon Agmon, Kfar-Sava (IL); David Zelig, Ramat-Gan (IL); Zvika Menahemi, Modi'in (IL)

(73) Assignee: Corrigent Systems Ltd., Tel Aviv (IL)

( * ) Notice: Subject to any disclaimer, the term of this patent is extended or adjusted under 35 U.S.C. 154(b) by 314 days.

(21) Appl. No.: 11/778,286

(22) Filed: Jul. 16, 2007

(65) Prior Publication Data

US 2008/0112323 A1   May 15, 2008

Related U.S. Application Data

(63) Continuation of application No. 11/559,037, filed on Nov. 13, 2006, now abandoned.

(51) Int. Cl.
*G06F 15/173* (2006.01)
*H04L 12/24* (2006.01)
*H04L 12/56* (2006.01)

(52) U.S. Cl. .................. 370/230; 370/235; 370/400; 370/401; 709/238

(58) Field of Classification Search .............. None
See application file for complete search history.

(56) References Cited

U.S. PATENT DOCUMENTS

| | | | |
|---|---|---|---|
| 5,285,441 A | 2/1994 | Bansal et al. | |
| 6,498,781 B1 * | 12/2002 | Bass et al. | 370/230.1 |
| 6,512,742 B1 * | 1/2003 | Alexander et al. | 370/231 |
| 6,600,741 B1 | 7/2003 | Chrin et al. | |
| 6,614,758 B2 * | 9/2003 | Wong et al. | 370/232 |
| 6,973,082 B2 * | 12/2005 | Devi et al. | 370/390 |
| 7,336,605 B2 * | 2/2008 | Bruckman et al. | 370/230 |
| 7,545,740 B2 * | 6/2009 | Zelig et al. | 370/230 |
| 7,551,636 B2 * | 6/2009 | Morrison | 370/412 |
| 2004/0008687 A1 | 1/2004 | Matsubara | |
| 2004/0017816 A1 | 1/2004 | Ishwar et al. | |
| 2004/0073640 A1 * | 4/2004 | Martin et al. | 709/223 |
| 2004/0228278 A1 * | 11/2004 | Bruckman et al. | 370/231 |
| 2005/0125490 A1 | 6/2005 | Ramia | |

(Continued)

OTHER PUBLICATIONS

Clause 43 of IEEE Standard 802.3, Carreir Sense Multiple Access with Collision Detection (CSMA/CD) Access Method and Physical Layer Specifications (2002 Edition).

(Continued)

*Primary Examiner*—Chi H Pham
*Assistant Examiner*—Soon-Dong D Hyun
(74) *Attorney, Agent, or Firm*—Darby & Darby P.C.

(57) ABSTRACT

A method for communication between first and second nodes via a communication network includes assigning multiple communication ports in two or more network nodes between the first and second nodes to serve as member ports of a multi-homing group (MHG). Each of the member ports is associated with a different, respective communication path between the first and second nodes via the communication network. A frame transmitted from the first node to the second node is accepted at the two or more network nodes. The frame has a header including header fields. A single port is selected from among the member ports by applying a hashing function to one or more of the header fields at each of the two or more network nodes. The frame is forwarded via the selected port over the respective communication path that is associated with the selected port.

28 Claims, 3 Drawing Sheets

U.S. PATENT DOCUMENTS

| | | | |
|---|---|---|---|
| 2005/0163115 A1 | 7/2005 | Dontu et al. | |
| 2007/0038767 A1 | 2/2007 | Miles et al. | |
| 2007/0237172 A1* | 10/2007 | Zelig et al. | 370/465 |
| 2008/0031263 A1 | 2/2008 | Ervin et al. | |

OTHER PUBLICATIONS

"Ethernet Protection Switching." Recommendation G.8031/Y.1342 of the International Telecommunication Union Telecommunication Standarization Sector (ITU-T), Jun. 2006.

IEEE 802.1D Standard, 2004 Ed. "IEEE Standard for Local and Metropolitan Area Networks—Media Access Control (MAC) Bridges."

IEEE 802.1Q Standard, 2003 Ed. "IEEE Standards for Local and Metropolitan Area Networks—Virtual Bridged Local Area Networks."

Product details for Ehternet Automatic Protection Switching (EAPS) available at http://www.extremenetworks.com.

Product details for Fast Ring Solution (T-FRS) available at http://www.foundrynet.com.

Brochure—Telco Systems Driving the IP Revolution. Telco Systems, A BATM Company. (http://www.batm.com/files/docs/metroehternetring.pdf).

IEEE draft standard 802.1AH/D3.01. "Provider Backbone Bridges." Sep. 2006.

* cited by examiner

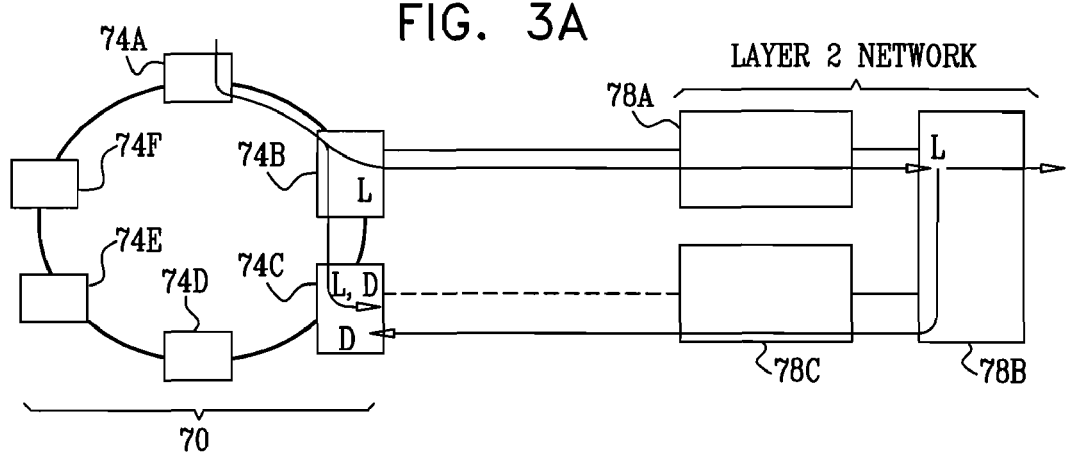
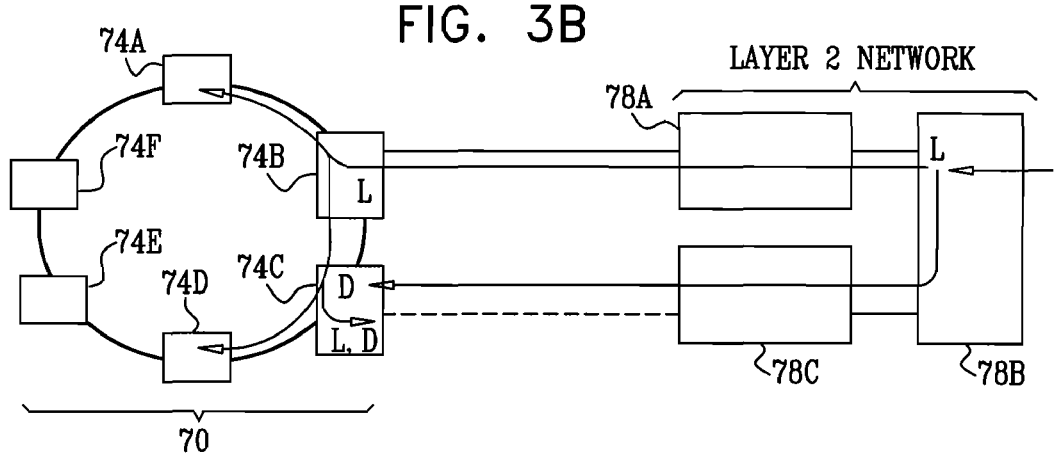

HASH-BASED MULTI-HOMING

This application is a continuation of U.S. Ser. No. 11/559,037, filed Nov. 13, 2006, the entire disclosure of which is incorporated by reference herein.

FIELD OF THE INVENTION

The present invention relates generally to communication networks, and particularly to methods and systems for communicating using alternative communication paths in layer-2 networks.

BACKGROUND OF THE INVENTION

Several methods and systems for setting up and using alternative communication paths between endpoints in layer-2 networks are known in the art. Alternative communication paths can be used in order to provide protection against failures and/or traffic load balancing. For example, link aggregation (LAG) is a technique by which a group of parallel physical links between two endpoints can be joined together into a single logical link. For Ethernet™ networks, link aggregation is defined by Clause 43 of IEEE Standard 802.3, Carrier Sense Multiple Access with Collision Detection (CSMA/CD) Access Method and Physical Layer Specifications (2002 Edition), which is incorporated herein by reference.

Another scheme that uses alternative links or ports is described in "Ethernet Protection Switching," Recommendation G.8031/Y.1342 of the International Telecommunication Union Telecommunication Standardization Sector (ITU-T), June, 2006, which is incorporated herein by reference.

The IEEE 802.1 standards specify several methods for establishing alternative paths using spanning-tree protocols (STP). Rapid STP (RSTP) is a version of STP that enables fast convergence of the communication path following network topology changes. RSTP is described in the IEEE 802.1D standard, 2004 edition, entitled "IEEE Standard for Local and Metropolitan Area Networks—Media Access Control (MAC) Bridges," which is incorporated herein by reference.

The IEEE 802.1Q standard, 2003 edition, entitled "IEEE Standards for Local and Metropolitan Area Networks—Virtual Bridged Local Area Networks," which is incorporated herein by reference, describes a multiple spanning tree protocol (MSTP), for use in networks that contain multiple virtual local area networks (VLANs).

Another form of providing alternative paths in a layer-2 network is by using bidirectional ring networks. For example, some networks comprise Resilient Packet Ring (RPR) configurations, as defined by the IEEE 802.17 working group. Applicable standards and additional details regarding RPR network configurations are available at www.ieee802.org/17.

Several methods and systems are known in the art for fast switch-over between alternative communication paths over ring networks. For example, Extreme Networks, Inc. (Santa Clara, Calif.) offers a protection solution called Ethernet Automatic Protection switching (EAPS). Further details regarding this product are available at www.extremenetworks.com. Foundry Networks, Inc. (Santa Clara, Calif.) uses a protocol called Metro Ring Protocol (MRP). Further details regarding this product are available at www.foundrynet.com. Telco Systems (Kfar Netter, Israel), a BATM company, offers a protocol called Fast Ring Solution (T-FRS). Further details regarding T-FRS are available at www.batm.com/files/docs/metroethernetring.pdf.

SUMMARY OF THE INVENTION

There is therefore provided, in accordance with an embodiment of the present invention, a method for communication between first and second nodes via a communication network, the method including:

assigning multiple communication ports in two or more network nodes between the first and second nodes to serve as member ports of a multi-homing group (MHG);

associating each of the member ports with a different, respective communication path between the first and second nodes via the communication network;

accepting at the two or more network nodes a frame transmitted from the first node to the second node, the frame having a header including header fields;

selecting a single port from among the member ports over which to forward the frame by applying a hashing function to one or more of the header fields at each of the two or more network nodes; and forwarding the frame via the selected port over the respective communication path that is associated with the selected port.

In an embodiment, the communication network includes at least one network selected from a group of networks consisting of a layer-2 network, a local area network and a ring network. Typically, selecting the single port includes refraining from sending the frame over member ports other than the selected port.

In some embodiments, the frame is associated with a traffic flow, and applying the hashing function includes defining the hashing function to select the selected port for all other frames associated with the traffic flow.

In another embodiment, the traffic flow is carried over a virtual local area network (VLAN), and defining the hashing function includes causing the hashing function to select the selected port for all other frames associated with the VLAN. In yet another embodiment, the traffic flow is carried over an inner VLAN, which is encapsulated in an outer VLAN, and defining the hashing function includes causing the hashing function to select the selected port for all other frames associated with the inner VLAN.

Additionally or alternatively, the traffic flow is carried over a virtual private local area network service (VPLS), and defining the hashing function includes causing the hashing function to select the selected port for all other frames associated with the VPLS.

Further additionally or alternatively, the frame is encapsulated by an outer MAC address and includes a service identification (I-SID) field that is associated with the traffic flow, and defining the hashing function includes causing the hashing function to select the selected port for all other frames associated with the outer MAC address and with the I-SID field.

In some embodiments, the method includes exchanging information regarding an activity status of the member ports among the two or more network nodes, and modifying the hashing function upon a change in the activity status to select the selected port only from among member ports that are currently active.

In an embodiment, selecting the single port includes:

accepting at the two or more network nodes replicas of an initial frame that has been flooded by the first node to a destination MAC address;

selecting the single port by applying the hashing function to the one or more of the header fields of the initial frame;

accepting subsequent unicast frames addressed to the destination MAC address only at one of the two or more network nodes, which includes the selected port; and upon a change in an activity status of the member ports, transmitting a flush message for instructing network elements in the communication network to send subsequent frames to the destination MAC address using flooding.

In another embodiment, the first node is part of a first network, the second node is part of a second network, and the two or more network nodes intermediate the first and second networks. The first network may include a ring network.

In yet another embodiment, network elements in the communication network perform frame forwarding based on a medium access control (MAC) learning process, and applying the hashing function includes defining the hashing function such that when the MAC learning process associates a set of frames with a MAC address, the hashing function selects an identical member port for all frames in the set. In still another embodiment, the set of frames includes one of frames associated with a particular VLAN and frames associated with a particular inner VLAN.

There is additionally provided, in accordance with an embodiment of the present invention, apparatus for communication, including two or more network nodes, for deployment in a communication network serving at least first and second nodes, the two or more nodes including multiple communication ports and are arranged to accept an assignment of the ports to serve as member ports of a multi-homing group (MHG), each of the member ports associated with a different, respective alternative communication path between the first and second nodes via the communication network, to accept a frame transmitted from the first node to the second node, the frame having a header including header fields, to select a single port from among the member ports over which to forward the frame by applying a hashing function to one or more of the header fields at each of the two or more network nodes, and to forward the frame via the selected port over the respective alternative communication path that is associated with the selected port.

The present invention will be more fully understood from the following detailed description of the embodiments thereof, taken together with the drawings in which:

BRIEF DESCRIPTION OF THE DRAWINGS

FIGS. 3A and 3B are block diagrams that schematically illustrate frame forwarding decisions in a communication network, in accordance with embodiments of the present invention.

DETAILED DESCRIPTION OF EMBODIMENTS

Overview

Figure 1:
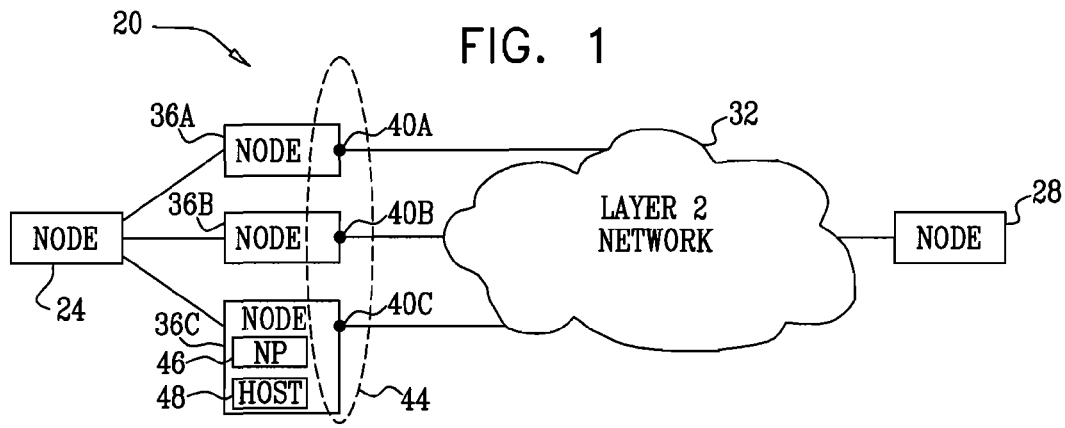
FIG. 1 is a block diagram that schematically illustrates a communication network, in accordance with an embodiment of the present invention.

Embodiments of the present invention provide improved methods and systems for communicating between two endpoints via a layer-2 network using alternative communication paths. In some embodiments, multiple ports, which typically reside in different network nodes located between the endpoints, are defined as members of a multi-homing group (MHG). Alternative communication paths between the endpoints are defined via the layer-2 network, with one path passing through each MHG member port. The alternative paths are referred to herein as multi-homing paths.

Since the member ports are distributed among different network nodes, the resulting set of alternative communication paths has no single point of failure, i.e., no single port, link or node that is common to all paths.

Each MHG node (i.e., a node comprising an MHG member port) applies a hashing function to certain header fields of each frame it receives, in order to determine whether to forward or discard the frame. The hashing function is defined so that each frame is forwarded via exactly one MHG member port and its respective multi-homing path. All the other member ports discard the frame. All MHG nodes use the same hashing function and apply the function to both incoming and outgoing frames. As a result, layer-2 loops are prevented.

The different network elements, and in particular the two endpoints, typically use a MAC learning process, as is known in the art, for learning through which of their ports to forward each frame. Initially, the source node broadcasts a frame addressed to the desired MAC address via all ports, in a process commonly referred to as flooding. Replicas of the frame are received by all MHG nodes, but only one of the MHG nodes forwards the frame via one of the MHG member ports. The other MHG nodes discard the frame, in accordance with the result of the hashing function.

The destination node responds to the initial frame with a unicast frame, which is forwarded back to the source node via the same route. From this stage, subsequent frames addressed to the same destination MAC address are transmitted to only one of the MHG nodes—the one comprising the selected MHG port.

When the frames are associated with particular traffic flows, such as flows of traffic carried on a particular VLAN, the hashing function is defined so that frames associated with a certain flow are forwarded via the same MHG member port and over the same multi-homing path. As a result, the frame order within each traffic flow is maintained.

When Q-in-Q VLAN, or VLAN stacking, is used, the hashing function can be defined so that traffic associated with different inner VLANs is forwarded over different multi-homing paths. Alternatively, traffic associated with the entire outer VLAN can be forwarded over a single multi-homing path.

The MHG nodes of a particular MHG group communicate with one another and distribute the current activity status of the MHG member ports. The MHG nodes use the updated status information to modify the hashing function, so that frames are forwarded only over currently-active member ports. In some embodiments, when the activity status of the MHG ports changes and traffic flows are shifted from one member port to another, the MHG nodes send a "flush" message. The flush message instructs the network elements to delete their MAC tables and flood subsequent unicast frames, thus causing a refresh of the MAC learning database, in order to adapt to the updated alternative path.

The methods and systems described herein provide protection against node and port failures, as well as traffic load balancing. In some embodiments, such as in RPR networks, traffic redirection in case of failure can be performed in less than 50 ms.

Unlike some known methods and systems that use alternative communication paths, the methods and systems described herein provide hash-based, frame-by-frame protection and load balancing. The load balancing may be based on inner and outer VLAN hierarchy, thus offering finer granularity and flexibility. In order to deploy the multi-homing methods described herein, configuration is performed only locally at the MHG nodes. Other parts of the network may be agnostic to the existence or functionality of multi-homing.

Distributing the traffic over multiple alternative paths also enables the network operator to deploy a higher number of lower-bandwidth links rather than fewer, higher-bandwidth links. Using a higher number of lower-bandwidth paths usually improves the even distribution of traffic among the paths, thus improving their utilization. Moreover, the different multi-homing paths are utilized during normal operation, and there are usually no normally-idle paths that are dedicated for protection.

Several exemplary multi-homing configurations are demonstrated hereinbelow, such as configurations for handing off traffic between a ring network and another layer-2 network and configurations for interconnecting two ring networks.

System Description

FIG. 1 is a block diagram that schematically illustrates a communication network 20, in accordance with an embodiment of the present invention. Two network nodes 24 and 28, referred to as endpoints, communicate with one another. Nodes 24 and 28 may comprise switches, routers or any other type of network element. Nodes 24 and 28 may also comprise ports of layer-2 aware nodes. The two endpoints communicate by exchanging Ethernet™ frames via network 20, and in particular traversing a layer-2 network 32. Network 32 may comprise, for example, an Ethernet switching network, an IEEE 802.17 RPR network or any other suitable layer-2 network.

In order to protect the communication between the endpoints against failures in network 20, as well as for providing traffic load balancing, two or more alternative communication paths are defined between node 24 and network 32. In the present example, three ports 40A ... 40C are selected and identified as members of a multi-homing group (MHG) 44. Three alternative communication paths connecting node 24 with network 32 are defined, one path passing through each of MHG member ports 40A ... 40C. These paths are referred to herein as multi-homing paths. The multi-homing paths are defined by a user, who also configures MHG nodes 36A ... 36C, as will be explained below.

In the example of FIG. 1, MHG members 40A ... 40C belong to network nodes 36A ... 36C, respectively. Nodes 36A ... 36C are referred to herein as MHG nodes, and may comprise switches, routers or any other type of network element. In the context of the methods described herein, the MHG nodes function as Layer-2 switches, providing node 24 alternate layer-2 paths towards network 32.

Each of the MHG nodes comprises a network processor (NP) 46, which performs frame processing functions, and a host processor 48, which performs management and configuration-related tasks, as will be explained in detail below. The hosts and network processors of the MHG nodes carry out the multi-homing communication methods described below. Network processor 46 is typically implemented using dedicated hardware or firmware, although some of its functions may be implemented in software. The functionality of NP 46 can also be carried out by a suitable microprocessor, a field-programmable gate array (FPGA), an application-specific integrated circuit (ASIC), or a combination of such components. Host 48 may be implemented using hardware, software, or a combination of hardware and software elements.

The network configuration of FIG. 1 is an exemplary configuration, chosen purely for the sake of conceptual clarity. The methods and systems described herein can be used with any other suitable network configuration. For example, although in the example of FIG. 1 each MHG member port resides in a different MHG node, some MHG nodes may comprise more than one member port. MHG group 44 may comprise any desired number of member ports. When the MHG group comprises two ports, the configuration is commonly referred to as dual-homing. Network 20 may comprise multiple different MHG groups.

Node 24 and MHG nodes 36A ... 36C may be interconnected by any suitable layer-2 network, such as a local area network (LAN) or an IEEE 802.17 RPR network. Several exemplary configurations in which the member ports reside in nodes of a RPR network are described in FIGS. 4-6 below.

In the description that follows, it is assumed that both network 32 and the network connecting node 24 and nodes 36A ... 36C are free of layer-2 loops. Physical loops within these networks can be resolved using known methods, such as STP, MSTP or 802.17 RPR methods. Additionally, it is assumed that STP/MSTP is not used over the multi-homing paths in network 32. The MHG nodes may, however, be defined as STP, RSTP and/or MSTP edge nodes in network 32.

Multi-Homing Method Description

The Ethernet frames exchanged between nodes 24 and 28 are often associated with certain traffic flows. For example, in some embodiments, network 20 supports Virtual Private LAN Services (VPLS), as are known in the art. The frames associated with a particular virtual LAN (VLAN) are identified by a unique virtual circuit (VC) label in the frame header.

Alternatively, frames belonging to a particular virtual LAN (VLAN) can be identified by a unique VLAN identifier (VID) in the frame header. In some cases, multiple VLANs are deployed in a hierarchical structure, commonly referred to as Q-in-Q VLAN or VLAN stacking. In VLAN stacking, several VLANs (denoted inner VLANs) are encapsulated and transported in an outer VLAN. In these cases, each Ethernet frame is identified by two identifiers—an inner VLAN VID and an outer VLAN VID.

Further alternatively, Ethernet frames may be forwarded using MAC-in-MAC encapsulation, as defined in the IEEE draft standard 802.1AH/D3.01, entitled "Provider Backbone Bridges," September, 2006, which is incorporated herein by reference. For frames encapsulated using MAC-in-MAC encapsulation, hashing can be performed over the outer MAC address and the 24-bit service ID (I-SID) field, which is similar to the VLAN-ID defined in the IEEE 802.1Q standard, cited above.

The methods and systems described herein enable bidirectional traffic to be forwarded between nodes 24 and 28 while ensuring that (1) all frames belonging to a particular flow are forwarded over the same MHG communication path and that (2) each frame is forwarded over one and only one of the alternative MHG communication paths. These two conditions ensure that the order of frames in each flow is maintained, that MAC learning processes used by the layer-2 network are not interfered with, and that layer-2 loops are prevented.

Ethernet frames exchanged between nodes 24 and 28 reach one or more of MHG nodes 36A ... 36C. In some cases, for example when flooding unicast frames or sending broadcast or multicast frames, identical replicas of a particular frame may reach all of the MHG nodes.

In each of the MHG nodes, network processor 46 determines whether to forward or discard a particular frame by applying a hashing function to the frame. Alternatively, the hashing function can be performed by host 48, in which case the NP is configured to forward or discard frames based on the hashing result calculated by the host.

The hashing function is defined so that exactly one of the MHG nodes will decide to forward the frame, and the other MHG nodes decide to discard it. As such, the operation is sometimes referred to herein as complementary hashing. Additionally, the function is defined so that all frames associated with the same traffic flow will produce the same hashing result, and will thus be forwarded via the same MHG node and over the same multi-homing path.

In order to prevent layer-2 loops, the same decision logic is applied both to frames sent from node 24 to node 28, and to frames sent from node 28 to node 24. Loop prevention using this mechanism is demonstrated in FIGS. 3A and 3B below.

Figure 2:
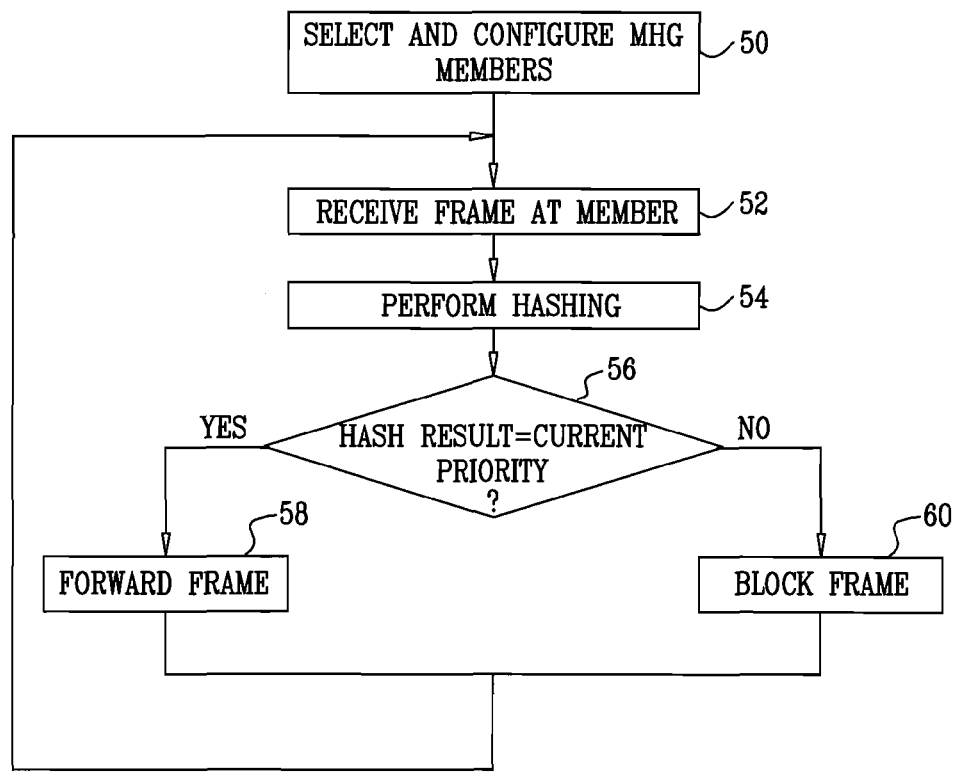
FIG. 2 is a flow chart that schematically illustrates a method for forwarding frames, in accordance with an embodiment of the present invention.

FIG. 2 is a flow chart that schematically illustrates a method for forwarding frames, in accordance with an embodiment of the present invention. The method begins with a user, such as a network designer, selecting and configuring two or more ports to serve as the MHG group members, at a configuration step 50.

The user configures the MHG nodes with MHG parameters, which define the operation of the node with regard to the MHG. Typically, the user provides the MHG parameters to host 48 of the MHG node, which in turn configures and controls the member port and network processor. In addition to parameters that define the hashing operation performed by the MHG nodes, the user may also configure each MHG node with the addresses of the other MHG nodes, in order to enable the MHG nodes to communicate with one another.

The MHG parameters usually comprise a total number of the MHG members in the group, denoted N. Additionally, each member port is assigned a priority index, denoted P, which identifies the specific member within the MHG group. For example, member ports 40A . . . 40C in FIG. 1 can be assigned P values of 0, 1 and 2, respectively.

Additionally, the user defines and configures a hashing type, which specifies the Ethernet frame header fields over which hashing is to be performed. For example, hashing may be performed over the VLAN VID, so that all frames associated with a certain VLAN will be forwarded over the same alternative path.

When VLAN stacking is used, hashing may be performed over the outer VLAN VID, or over both outer and inner VLAN VIDs. Hashing over both outer and inner VLAN VIDs enables the user to select a different communication path for each inner VLAN, thus providing finer granularity and flexibility of protection and/or statistically-better load balancing.

The same hashing type is configured in all MHG nodes. Note that multi-homing configuration is performed only in the MHG nodes, i.e., the nodes containing member ports, and does not involve any other network nodes. Typically, the MHG parameters are stored by hosts 48 of the MHG nodes, which configure and control the network processors and ports.

The MHG nodes receives Ethernet frames exchanged between nodes 24 and 28, at a frame receiving step 52. The received frames may comprise frames originating from node 24 and addressed to node 28, frames originating from node 28 and addressed to node 24, or both. For each received frame, NP 46 of the MHG node accepting the frame performs hashing, at a hashing step 54. The NP performs hashing in accordance with the hashing type configured at step 50 above.

For example, assume that in the configuration of FIG. 1 above N=3 and that the three member ports are assigned P values of 0, 1 and 2. When the hashing type indicates that hashing is performed over both outer and inner VLAN VIDs, an exemplary hashing function may comprise:

$$\text{Result} = ((\text{outer VLAN VID} \oplus \text{inner VLAN VID}) \text{ Modulo } N)$$

wherein $\oplus$ denotes bitwise exclusive OR (XOR)

The network processor checks whether the result of the hashing operation equals the priority index of the member port, at a hash result checking step 56. If the hash result is equal to the priority index of the member port, the network processor forwards the frame to the corresponding member port, at a forwarding step 58. The frame is thus sent over the multi-homing path that traverses the selected member port. Otherwise, i.e., if the hash result is different from the priority index of the port, the network processor discards the frame, at a discarding step 60.

For example, assume that a frame having an outer VLAN VID of 0x5 and an inner VLAN VID of 0x11 is accepted at the three member ports. In this case, Result=((0x5$\oplus$0x11) Modulo 3)=2. All three network processors apply the same hashing function and calculate the same result. Two of the nodes, the ones having priority indices 0 and 1, drop the frame. Only the node having a priority index P=2 forwards the frame.

In some cases, one or more of the MHG member ports may become inactive. For example, a port may fail or may be deliberately disabled for maintenance. In order to provide protection in such cases, the current status of the member ports is distributed among the MHG nodes, and the MHG nodes adapt the hashing operation to include only the subset of member ports that are currently active. Using this mechanism, frames or flows that were originally intended to pass through a deactivated member port will be forwarded over an alternative member port and communication path.

In these embodiments, the MHG nodes communicate with one another, either over network 32 or over the network connecting the MHG nodes and node 24. Hosts 48 of the MHG nodes update one another with the current activity status of each member port and the number of currently-active member ports. Any suitable protocol can be used to distribute status information among the MHG ports, such as, for example, using G.8031-like status information. In addition to a binary active/inactive status notification, the protocol may distribute additional information, such as Wait-To-Restore (WTR) parameters.

The number of currently-active member ports is denoted M, M$\leq$N. By communicating with one another, the MHG nodes configure the priority indices P of the member ports, so that the currently-active member ports are assigned priority indices in the range P=0 . . . (M-1). For example, in the configuration of FIG. 1 above, when all three ports 40$k$ . . . 40C are active, they are assigned priority indices 0 . . . 2, respectively. If port 40B fails or otherwise becomes inactive, nodes 36A . . . 36C modify the priority indices so that port 40A is assigned P=0 and port 40C is assigned P=1. The number of currently-active ports is M=2, and the hashing function calculated by the different network processors is now performed Modulo 2.

When a previously-disabled MHG member port is restored, there may exist a transient time interval, during which the port is already active but the hashing function has not yet been updated accordingly. In some embodiments, the communication protocol among the MHG nodes synchronizes the updating of the hashing function with the re-enabling of the port, in order to prevent frame duplication. Typically, all MHG nodes should discard the frames associated with the protected member port during this transient interval, which is usually shorter than 50 ms.

In the decision process defined above, it is assumed that the nodes of network 32 use VLAN-based MAC learning, as is known in the art. MAC learning enables a network node to learn via which of its ports to forward frames addressed to a particular destination MAC address. In a typical transaction, the source endpoint initially does not know through which port to forward frames addressed to the destination endpoint. The source endpoint thus sends the frame though all of its ports, in a process commonly referred to as flooding.

Replicas of the flooded frame are received by all MHG nodes, but only one of the MHG nodes forwards the frame via one of the MHG member ports. The other MHG nodes discard the frame, in accordance with the result of the hashing function.

The destination node receives the flooded frame through one of its ports, and responds to the frame via the same port. Nodes that receive the response frame update their MAC tables based on the port via which the response frame was received, and continue to forward the response frame toward the source node. From this stage, subsequent frames addressed to the same destination MAC address comprise frames that reach only one of the MHG nodes—the one comprising the selected MHG port.

Network 32 may apply different modes of MAC learning with regard to VLAN services. For example, the nodes of network 32 may learn the location of MAC addresses regardless of the VLANs used. Alternatively, the nodes can learn by {MAC address, outer VLAN} or by {MAC address, outer VLAN, inner VLAN}.

When defining the hashing type at configuration step 50 above, the hashing type is specified so that it does not have a finer resolution than the MAC learning mode of the network. Otherwise, a node may accept frames that are associated with the same MAC learning class through different ports within a short period of time, which may confuse the MAC learning process.

For example, if the MAC learning process of network 32 uses MAC addresses only, the hashing type should also disregard the VLAN affiliation of the frames. In such a case, all traffic flows through the same multi-homing path. If this path fails, all traffic is transferred to another path. In this case, the hashing function uses only parameter P, e.g., transfers all frames via the member port corresponding to P=0.

If the nodes of network 32 learn by {MAC address, outer VLAN}, the hashing should not be performed over the inner VLAN VID. If network 32 learns MAC addresses by {MAC address, outer VLAN, inner VLAN} then hashing may be performed over the outer VLAN VID or over both outer and inner VLAN VIDs.

When the activity status of the MHG ports changes, such as when a member port fails or is re-activated, traffic flows are shifted from one member port to another. In order to enable the source endpoint to adapt to the updated alternative path, the MHG nodes send a "flush" message across network 20 whenever the activity status of the MHG members changes.

For example, when a member port fails, the MHG node comprising the failed port initiates a flush message to divert the traffic from the failed port to an alternative MHG member port. When a member port is added to the MHG, or when a previously-inactive member port is re-activated, the MHG nodes other than the node comprising the new port initiate flush messages in order to divert some of their traffic to the new member port. When an MHG node fails, another MHG node may initiate a flush message on its behalf. Flush messages may also be generated and sent within network 32, for example using the STP protocol.

The flush operation causes different elements of network 20 and network 32, and in particular the two endpoints (depending on the layer-2 network topology), to delete and refresh their MAC learning data. As a result, the source endpoint is forced to re-initialize its MAC learning process and start flooding frames. Replicas of each flooded frame reach all MHG nodes. The MHG nodes apply the updated hashing function and determine an updated member port over which to forward the frame. Consequently, the MAC learning process adapts to the updated member port and alternative path.

The flush messages can be defined as specific to a particular VLAN or VPLS. In some cases, standard messages can be used to implement the flush messages. For example, in IEEE 802.17b RPR networks, flush messages can be implemented using OAM_SAS_NOTIFY frames. When using STP, flush message can make use of topology change notification (TCN) messages. Otherwise, proprietary messages can be defined.

The response time of the status distribution and MAC learning update process has a significant effect on the switchover time in case of node or port failure. In some cases, such as in IEEE 802.17 RPR networks, traffic redirection to an alternative multi-homing path can be performed in less than 50 ms. The performance of the protocol can also determine the extent of data interruption when a member port fails. If the protocols enable the MHG nodes to modify the hashing function rapidly and the MAC learning to update quickly, fewer frames will be lost during the adaptation.

Multi-Homing In Ring Networks

FIGS. 3A and 3B are block diagrams that schematically illustrate frame forwarding decisions in a communication network, in accordance with embodiments of the present invention. The network of FIGS. 3A and 3B comprises an RPR network 70, which comprises six nodes 74A . . . 74F, and a layer-2 network, which comprises three nodes 78A . . . 78C. Nodes 74B and 74C connect the RPR network with the layer-2 network. Nodes 74B and 74C are defined as MHG nodes, and the ports connecting them to the layer-2 network are defined as MHG members.

In FIG. 3A, a broadcast frame, such as an address resolution protocol (ARP) frame, enters the RPR network via node 74A. The frame is broadcast to all nodes 74A . . . 74F, and in particular to MHG nodes 74B and 74C. The two MHG nodes apply hashing to the frame, as described above. In the present example, the hashing result causes node 74B to pass the frame and node 74C to discard it. (In the figure, "L" denotes "learn" and "D" denotes "drop.")

When the frame reaches the layer-2 network, it is broadcast to all nodes and ports. In particular, the frame is forwarded via node 78C back to node 74C of the RPR network. Node 74C, being an MHG node, applies the same hashing operation to both incoming and outgoing frames. As a result, node 74C discards the frame accepted from node 78C, thus preventing a layer-2 loop.

In FIG. 3B, a frame belonging to the same flow, such as an ARP request towards node 74A, enters the layer-2 network at node 78B. The frame is broadcast, and in particular forwarded to MHG nodes 74B and 74C of the RPR network. Since the frame belongs to the same flow as the frame described in FIG. 3A above, the hashing result causes node 74B to pass the frame while node 74C drops it. Node 74B forwards the frame over the RPR network, and in particular to node 74C. Again, node 74C calculates a hashing result that causes it to drop the frame. Thus, a layer-2 loop is prevented.

Additional Network Configurations

Figure 4:
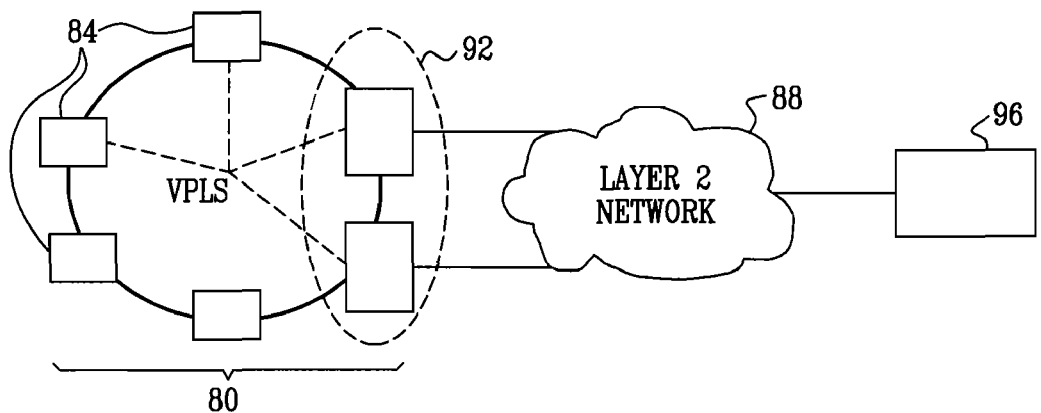
FIGS. 4-6 are block diagrams that schematically illustrate communication networks, in accordance with embodiments of the present invention.
Figure 5:
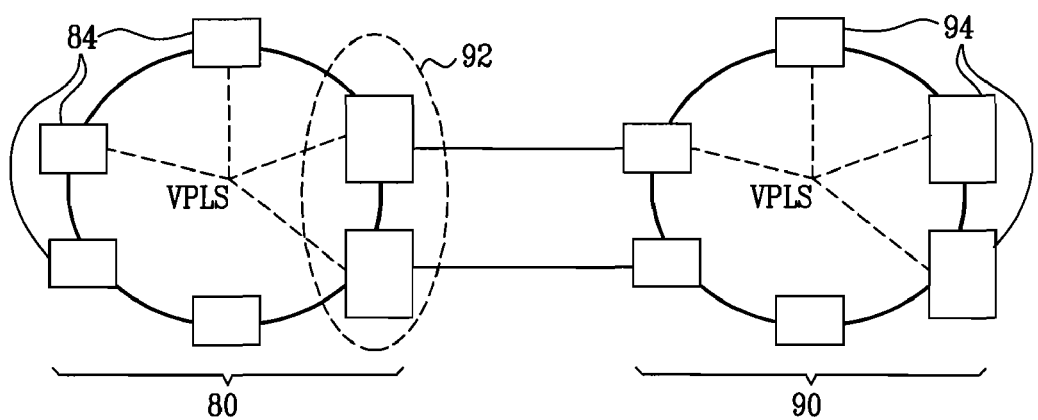
Figure 6:
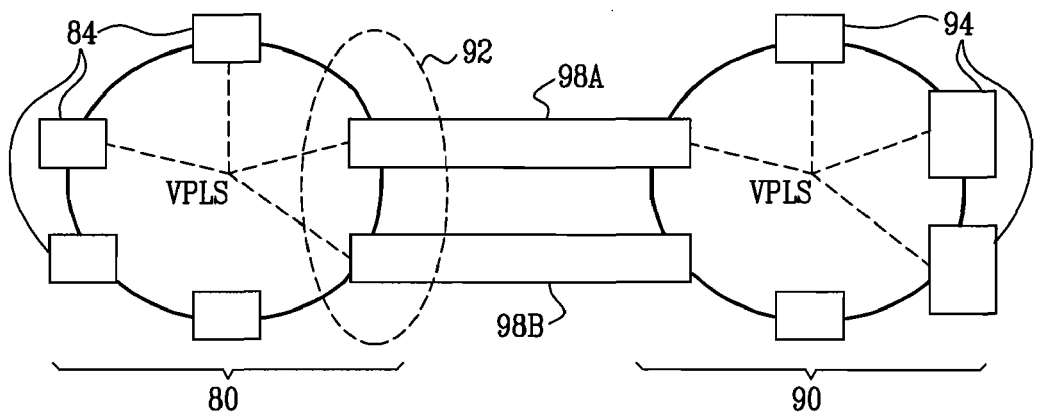

FIGS. 4-6 are block diagrams that schematically illustrate exemplary multi-homing configurations, in accordance with embodiments of the present invention.

FIG. 4 shows a configuration, in which traffic is handed off between a ring network 80 and a layer-2 network 88 using hash-based dual-homing. Ring network 80 comprises six ring nodes 84. Two of the ring nodes comprise ports connected to network 88. The two ports are defined as members of a MHG 92. At least some of the ring nodes, and in particular the MHG nodes, support VPLS. The dual-homing configuration of FIG. 4 enables protected and load-balanced layer-2 communication between ring network 80 and network 88, for example in order to communicate with a remote node 96. Note that MHG configuration is performed only at the two MHG nodes of MHG 92, i.e., on only one side of the multi-homing paths. The other side of the path is typically agnostic to the existence and functionality of the MHG.

FIG. 5 shows a configuration, in which two ring networks 80 and 90 are connected using hash-based multi-homing. Again, MHG configuration is performed only at the nodes of MHG 92. In particular, nodes 94 of ring network 90 are unaware of the MHG.

FIG. 6 shows another configuration for connecting two ring networks using hash-based dual-homing. In the example of FIG. 6, two ring nodes 98A and 98B are common to both ring networks.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication between first and second nodes via a communication network, the method comprising:

assigning multiple communication ports in two or more network nodes between the first and second nodes to serve as member ports of a multi-homing group (MHG);

associating each of the member ports with a different, respective communication path between the first and second nodes via the communication network;

accepting at the two or more network nodes a frame transmitted from the first node to the second node, the frame having a header comprising header fields;

selecting a single port from among the member ports over which to forward the frame by applying a hashing function to one or more of the header fields at each of the two or more network nodes; and forwarding the frame via the selected port over the respective communication path that is associated with the selected port.

2. The method according to claim 1, wherein the communication network comprises at least one network selected from a group of networks consisting of a layer-2 network, a local area network and a ring network.

3. The method according to claim 1, wherein selecting the single port comprises refraining from sending the frame over member ports other than the selected port.

4. The method according to claim 1, wherein the frame is associated with a traffic flow, and wherein applying the hashing function comprises defining the hashing function to select the selected port for all other frames associated with the traffic flow.

5. The method according to claim 4, wherein the traffic flow is carried over a virtual local area network (VLAN), and wherein defining the hashing function comprises causing the hashing function to select the selected port for all other frames associated with the VLAN.

6. The method according to claim 5, wherein the traffic flow is carried over an inner VLAN, which is encapsulated in an outer VLAN, and wherein defining the hashing function comprises causing the hashing function to select the selected port for all other frames associated with the inner VLAN.

7. The method according to claim 4, wherein the traffic flow is carried over a virtual private local area network service (VPLS), and wherein defining the hashing function comprises causing the hashing function to select the selected port for all other frames associated with the VPLS.

8. The method according to claim 4, wherein the frame is encapsulated by an outer MAC address and comprises a service identification (I-SID) field that is associated with the traffic flow, and wherein defining the hashing function comprises causing the hashing function to select the selected port for all other frames associated with the outer MAC address and with the I-SID field.

9. The method according to claim 1, and comprising exchanging information regarding an activity status of the member ports among the two or more network nodes, and modifying the hashing function upon a change in the activity status to select the selected port only from among member ports that are currently active.

10. The method according to claim 1, wherein selecting the single port comprises:

accepting at the two or more network nodes replicas of an initial frame that has been flooded by the first node to a destination MAC address;

selecting the single port by applying the hashing function to the one or more of the header fields of the initial frame;

accepting subsequent unicast frames addressed to the destination MAC address only at one of the two or more network nodes, which comprises the selected port; and upon a change in an activity status of the member ports, transmitting a flush message for instructing network elements in the communication network to send subsequent frames to the destination MAC address using flooding.

11. The method according to claim 1, wherein the first node is part of a first network, wherein the second node is part of a second network, and wherein the two or more network nodes intermediate the first and second networks.

12. The method according to claim 11, wherein the first network comprises a ring network.

13. The method according to claim 1, wherein network elements in the communication network perform frame forwarding based on a medium access control (MAC) learning process, and wherein applying the hashing function comprises defining the hashing function such that when the MAC learning process associates a set of frames with a MAC address, the hashing function selects an identical member port for all frames in the set.

14. The method according to claim 13, wherein the set of frames comprises one of frames associated with a particular VLAN, and frames associated with a particular inner VLAN.

15. Apparatus for communication, comprising two or more network nodes, for deployment in a communication network serving at least first and second nodes, the two or more nodes comprising multiple communication ports and are arranged to accept an assignment of the ports to serve as member ports of a multi-homing group (MHG), each of the member ports associated with a different, respective alternative communication path between the first and second nodes via the communication network, to accept a frame transmitted from the first node to the second node, the frame having a header comprising header fields, to select a single port from among the member ports over which to forward the frame by applying a hashing function to one or more of the header fields at each of the two or more network nodes, and to forward the frame via the selected port over the respective alternative communication path that is associated with the selected port.

16. The network according to claim 15, wherein the communication network comprises at least one network selected from a group of networks consisting of a layer-2 network, a local area network and a ring network.

17. The network according to claim 15, wherein the two or more nodes are arranged to refrain from sending the frame over member ports other than the selected port.

18. The network according to claim 15, wherein the frame is associated with a traffic flow, and wherein the hashing function is arranged to select the selected port for all other frames associated with the traffic flow.

19. The network according to claim 18, wherein the traffic flow is carried over a virtual local area network (VLAN), and wherein the hashing function is arranged to select the selected port for all other frames associated with the VLAN.

20. The network according to claim 19, wherein the traffic flow is carried over an inner VLAN, which is encapsulated in an outer VLAN, and wherein the hashing function is arranged to select the selected port for all other frames associated with the inner VLAN.

21. The network according to claim 18, wherein the traffic flow is carried over a virtual private local area network service (VPLS), and wherein the hashing function is arranged to select the selected port for all other frames associated with the VPLS.

22. The network according to claim 18, wherein the frame is encapsulated by an outer MAC address and comprises a service identification (I-SID) field that is associated with the traffic flow, and wherein the hashing function is arranged to select the selected port for all other frames associated with the outer MAC address and with the I-SID field.

23. The network according to claim 15, wherein the two or more nodes are arranged to exchange information regarding an activity status of the member ports, and to modify the hashing function upon a change in the activity status to select the selected port only from among member ports that are currently active.

24. The network according to claim 15, wherein the two or more nodes are arranged to accept replicas of an initial frame that has been flooded by the first node to a destination MAC address, to select the single port by applying the hashing function to the one or more of the header fields of the initial frame, to accept subsequent unicast frames addressed to the destination MAC address at only one of the two or more network nodes, which comprises the selected port, and, upon a change in an activity status of the member ports, to transmit a flush message for instructing network elements in the communication network to send subsequent frames to the destination MAC address using flooding.

25. The network according to claim 15, wherein the first node is part of a first network, wherein the second node is part of a second network, and wherein the two or more network nodes intermediate the first and second networks.

26. The network according to claim 25, wherein the first network comprises a ring network.

27. The network according to claim 15, wherein network elements in the communication network perform frame forwarding based on a medium access control (MAC) learning process, and wherein the hashing function is defined such that when the MAC learning process associates a set of frames with a MAC address, the hashing function selects an identical member port for all frames in the set.

28. The network according to claim 27, wherein the set of frames comprises one of frames associated with a particular VLAN, and frames associated with a particular inner VLAN.

\* \* \* \* \*